(12) United States Patent
Mazumder et al.

(10) Patent No.: US 7,765,022 B2
(45) Date of Patent: Jul. 27, 2010

(54) DIRECT METAL DEPOSITION APPARATUS UTILIZING RAPID-RESPONSE DIODE LASER SOURCE

(75) Inventors: Jyoti Mazumder, Ann Arbor, MI (US);
Dwight Morgan, Rochester, MI (US);
Timothy W. Skszek, Saline, MI (US);
Matthew Lowney, Novi, MI (US)

(73) Assignee: The P.O.M. Group, Auburn Hills, MI (US)

( * ) Notice: Subject to any disclaimer, the term of this patent is extended or adjusted under 35 U.S.C. 154(b) by 1817 days.

(21) Appl. No.: 09/916,566

(22) Filed: Jul. 27, 2001

(65) Prior Publication Data

US 2002/0065573 A1 May 30, 2002

Related U.S. Application Data

(63) Continuation-in-part of application No. 09/526,631, filed on Mar. 16, 2000, now Pat. No. 6,937,921, and a continuation-in-part of application No. 09/570,986, filed on May 15, 2000, now Pat. No. 6,410,105, and a continuation-in-part of application No. 09/608,874, filed on Jun. 30, 2000, now Pat. No. 7,286,893, which is a continuation-in-part of application No. 09/107,912, filed on Jun. 30, 1998, now Pat. No. 6,122,564.

(60) Provisional application No. 60/221,250, filed on Jul. 27, 2000.

(51) Int. Cl.
*G06F 19/00* (2006.01)

(52) U.S. Cl. .................. 700/121; 219/121.61

(58) Field of Classification Search ......... 700/118–119, 700/123, 166, 121; 427/554; 219/121.61, 219/121.66, 121.78; 372/34, 75, 69, 70
See application file for complete search history.

(56) References Cited

U.S. PATENT DOCUMENTS

| 4,371,784 | A | * | 2/1983 | Rodgers | 250/231.12 |
|---|---|---|---|---|---|
| 4,719,631 | A | * | 1/1988 | Conaway | 372/34 |
| 5,124,993 | A | * | 6/1992 | Braunlich et al. | 372/31 |
| 5,138,624 | A | * | 8/1992 | Hong et al. | 372/45.01 |
| 5,432,535 | A | * | 7/1995 | Andrews et al. | 347/242 |
| 5,449,536 | A | * | 9/1995 | Funkhouser et al. | 427/597 |
| 5,837,960 | A | * | 11/1998 | Lewis et al. | 219/121.63 |
| 6,046,426 | A | * | 4/2000 | Jeantette et al. | 219/121.63 |
| 6,146,025 | A | * | 11/2000 | Abbink et al. | 385/88 |
| 6,201,210 | B1 | * | 3/2001 | Sans I Ravellat et al. | 219/121.61 |
| 6,211,080 | B1 | * | 4/2001 | Tatah | 438/680 |
| 6,504,127 | B1 | * | 1/2003 | McGregor et al. | 219/121.63 |
| 6,526,327 | B2 | * | 2/2003 | Kar et al. | 700/119 |
| 6,531,191 | B1 | * | 3/2003 | Notenboom | 427/554 |

* cited by examiner

*Primary Examiner*—Kidest Bahta
(74) *Attorney, Agent, or Firm*—Gifford, Krass, Sprinkle, Anderson & Citkowski, P.C.

(57) ABSTRACT

The present invention incorporates one or more diode lasers for the high-power $CO_2$ or Nd-YAG lasers currently used in closed-loop DMD systems. Being semiconductor-based, such devices are almost instantaneously responsive to the electrical input. As such, a DMD system driven by a diode laser according to the invention provides a much faster response compared to other sources. The faster response time, in turn, provides for enhanced dimensional control and capability to produce intricate components with better dimensional accuracy.

5 Claims, 6 Drawing Sheets

*(11.6-mm Stand-off)*

*(28-mm Stand-off)*

DIRECT METAL DEPOSITION APPARATUS UTILIZING RAPID-RESPONSE DIODE LASER SOURCE

REFERENCE TO RELATED APPLICATIONS

This application claims priority of U.S. Provisional patent application Ser. No. 60/221,250, filed Jul. 27, 2000, and is a continuation-in-part of U.S. patent application Ser. Nos. 09/526,631, filed Mar. 16, 2000 now U.S. Pat. No. 6,937,921; 09/570,986, filed May 15, 2000 now U.S. Pat. No. 6,410,105; and 09/608,874, filed Jun. 30, 2000 now U.S. Pat. No. 7,286,893, which is a continuation-in-part of U.S. patent application Ser. No. 09/107,912, filed Jun. 30, 1998, now U.S. Pat. No. 6,122,564, the entire contents of each application being incorporated herein by reference.

FIELD OF THE INVENTION

This invention relates generally to additive manufacturing and, in particular, to a direct metal deposition (DMD™) system utilizing a rapid-response diode laser source.

BACKGROUND OF THE INVENTION

Fabrication of three-dimensional metallic components via layer-by-layer laser cladding was first reported in 1978 by Breinan and Kear. In 1982, U.S. Pat. No. 4,323,756 issued to Brown et al., which describes a method for the production of bulk, rapidly solidified metallic articles, finding particular utility in the fabrication of certain gas turbine engine components including discs and knife-edge air seals.

Recently, various groups around the world have been working on different types of layered manufacturing techniques for fabrication of near-net-shape metallic components. Recent innovations include the integration of lasers with multi-axis CNC machines and co-axial nozzles toward the fabrication of three-dimensional components.

However, previous approaches are all open-loop processes requiring either a considerable amount of periodic machining or final machining to achieve close dimensional tolerances. Continuous corrective measures during the manufacturing process are necessary to fabricate net shape functional parts with close tolerances and acceptable residual stress.

U.S. Pat. No. 6,122,564, the entire contents of which are incorporated herein by reference, describes a laser-based, direct metal deposition fabrication process capable of producing near net-shape, fully dense molds, dies, and precision parts, as well as engineering changes or repairs to existing tooling or parts. According to the process, an industrial laser beam is focused onto a workpiece, creating a melt pool into which powdered metal is injected. The beam is moved under CNC control, based on a CAD geometry, tracing out the part, preferably on a layer-by-layer basis. Optical feedback is preferably used to maintain tight closed-loop control over the process.

Initial data using an optical feedback loop along with a CNC working under the instructions from a CAD/CAM software, indicate that closed-loop DMD can be used to produce three-dimensional components directly from the CAD data, thereby eliminating intermediate machining and considerably reducing the amount of final machining. This technology is now being commercialized, with surface finishes on the order of 100 micron being routinely achievable. In addition to close-dimensional tolerances, the closed-loop DMD process enables fabrication of components with multiple materials.

At present, the DMD system utilizes either a high-power $CO_2$ or Nd-YAG laser. Closed-loop control using the optical feedback response partly depends on the laser pumping mechanism and its response to the signal from the feedback loop. For a $CO_2$ laser, response time is influenced by the relaxation behavior of the gas medium and excitation mechanism such as radio frequency (RF) or direct current. Carbon dioxide and nitrogen gases in a $CO_2$ laser exhibit minimal response to a signal above 25 kHz; even above 5 KHz, response is rather sluggish.

Thus, the need remains for a system and method to improve the response time in laser-assisted direct metal deposition processes.

SUMMARY OF THE INVENTION

Broadly, this invention incorporates one or more diode lasers for the high-power $CO_2$ or Nd-YAG lasers currently used in closed-loop DMD systems. Being semiconductor-based, such devices are almost instantaneously responsive to the electrical input. As such, a DMD system driven by a diode laser according to the invention provides a much faster response compared to other sources. The faster response time, in turn, provides for enhanced dimensional control and capability to produce intricate components with better dimensional accuracy.

DETAILED DESCRIPTION OF THE INVENTION

As described in U.S. Pat. No. 6,122,564, the entire contents of which are incorporated herein by reference, a closed-loop direct metal deposition (DMD™) process may be employed to fabricate three-dimensional components utilizing the tool path generated by a suitably equipped CAD/CAM package. A complex shape is generated by delivering desired material (i.e., metal/alloy powder or wire) to a laser-melted pool, with a finished part being created by changing the relative position of the laser beam and the substrate. The system may use a stationary beam and material delivery system in conjunction with a moving substrate, or the beam and material delivery system may be moved relative to a stationary substrate.

Figure 1:
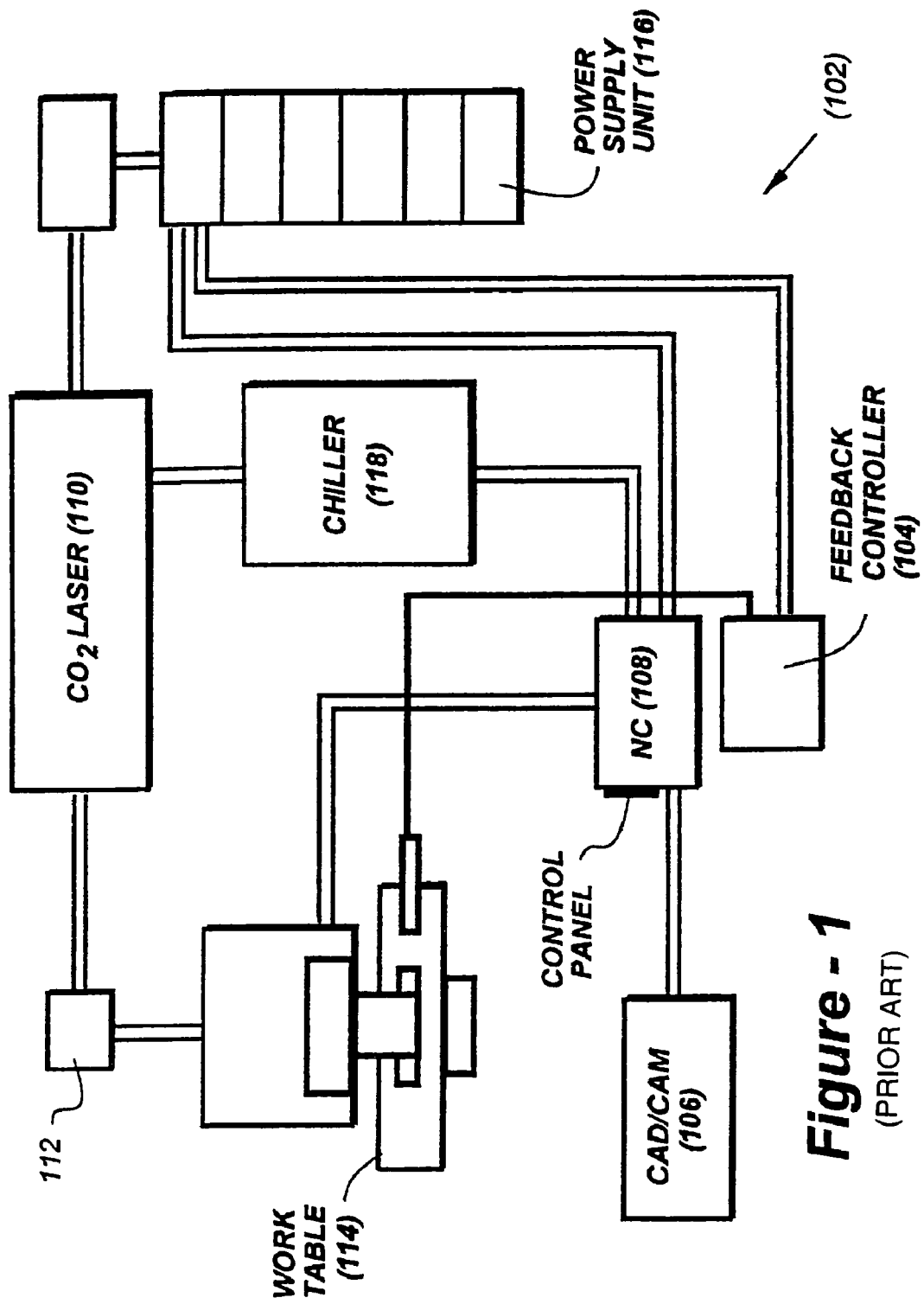
FIG. 1 shows a laser-aided, computer-controlled DMD system.
Figure 2:
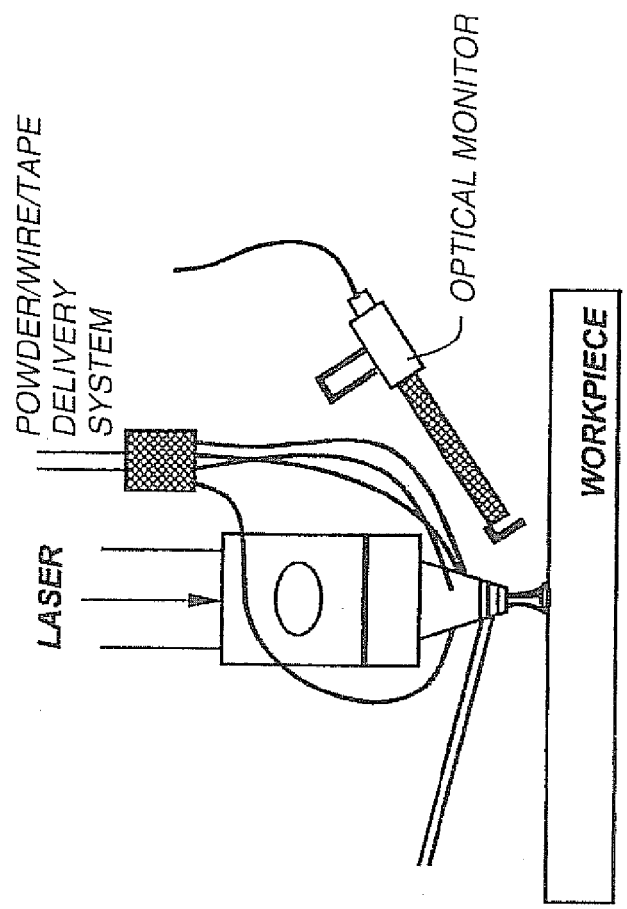
FIG. 2 shows an optical feedback monitoring system.

FIG. 1 shows a laser-aided, computer-controlled DMD system schematically at 102 being used to apply layers of material on a substrate to fabricate an object or cladding. The system is preferably equipped with feedback monitoring, better seen in FIG. 2, to control of the dimensions and overall geometry of the fabricated article. The geometry of the article is provided by a computer-aided design (CAD) system.

The deposition tool path is generated by a computer-aided manufacturing (CAM) system for CNC machining with post-processing software for deposition, instead of software for removal as in conventional CNC machining. CAM software interfaces with a feedback controller 104. These details of the laser-aided, computer controlled direct material deposition system can be found in U.S. Pat. No. 6,122,564, and are not all explicitly shown in FIGS. 1 and 2.

The factors that affect the dimensions of material deposition include laser power, beam diameter, temporal and spatial distribution of the beam, interaction time, and powder flow rate. Adequate monitoring and control of laser power, in particular, has a critical effect on the ability to fabricate completed parts and products with complex geometries and within control tolerances. Accordingly, the feedback controller 104 of the direct material deposition system typically cooperates directly with the numerical controller 108, which, itself, controls all functions of the direct material deposition system, including laser power.

The laser source 110 of the DMD system is redirected at 112 above the substrate and a layer of material is deposited according to the description of the object. The laser has sufficient density to create a melt pool with the desired composition of substrate or previously deposited layer and cladding powder. The cladding powder, typically metallic, is sprayed on the substrate preferably through a laser spray nozzle with a concentric opening for the laser beam, as described in U.S. Pat. No. 4,724,299, so that the powder exits the nozzle co-axially with the beam.

A numerical controller 108 controls all operating components of the DMD system of FIG. 1, including the operating conditions of the laser, receiving direction from the CAD/CAM system 106 for building the part or product. The numerical controller 108 also receives feedback control signals from the feedback controller 104 to adjust laser power output, and further controls the relative position of the substrate and laser spray nozzle. The CAD/CAM system 106 is equipped with software which enables it to generate a path across the substrate for material deposition.

According to this invention, the dimensional accuracy of components fabricated using closed-loop direct metal deposition is improved through a nozzle design incorporating a rapid response semiconductor laser. This improvement, in conjunction with improved powder focusing characteristics, powder utilization and shielding achieves enhanced surface finish characteristics.

In this invention, a diode laser is used as the energy source for the closed-loop DMD system. The optical signal from the laser interaction zone is used to modulate the diode laser to control the power. Since the diode lasers can respond to signals at a rate up to 20 KHz, the laser power can be finely tuned to the process at faster rate than that by $CO_2$ or YAG lasers and thus the deposition height.

Figure 3:
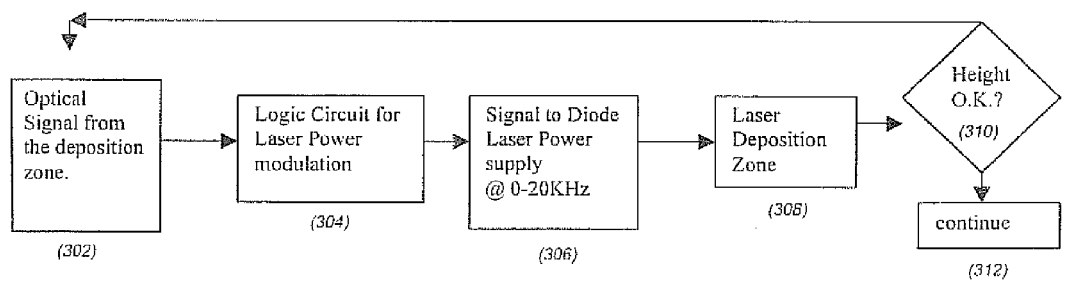
FIG. 3 is a flow chart for the optical feedback control loop for the diode laser based DMD system.

FIG. 3 is a flow chart for the optical feedback control loop for the diode laser based DMD system. At block 302 an optical signal is obtained from the deposition zone. At block 304, logic circuitry is used to modulate the laser power, with a signal being sent to the diode laser power supply at a frequency to 0 to 20 KHz, or higher frequency, depending upon the response time of the device. This is delivered to the laser deposition zone at 308 in the form of optical energy, but the question regarding height (or other physical characteristics) being asked at decision block 310. If the height or other characteristics is acceptable, the process continues at 312; otherwise, control is returned to block 302 for the receipt of a new optical signal.

A primary advantage of diode laser based DMD is the high-speed feedback up to 20 KHz. Present feedback loop for $CO_2$ laser can be modulated up to 60 Hz. DMD surface profit height geometry and microstructure are greatly modulated by the frequency of the feedback signal. The more than 300 times increase of the frequency will improve the process significantly and will take it to new paradigm of control of closed loop direct metal deposition.

Figure 4A:
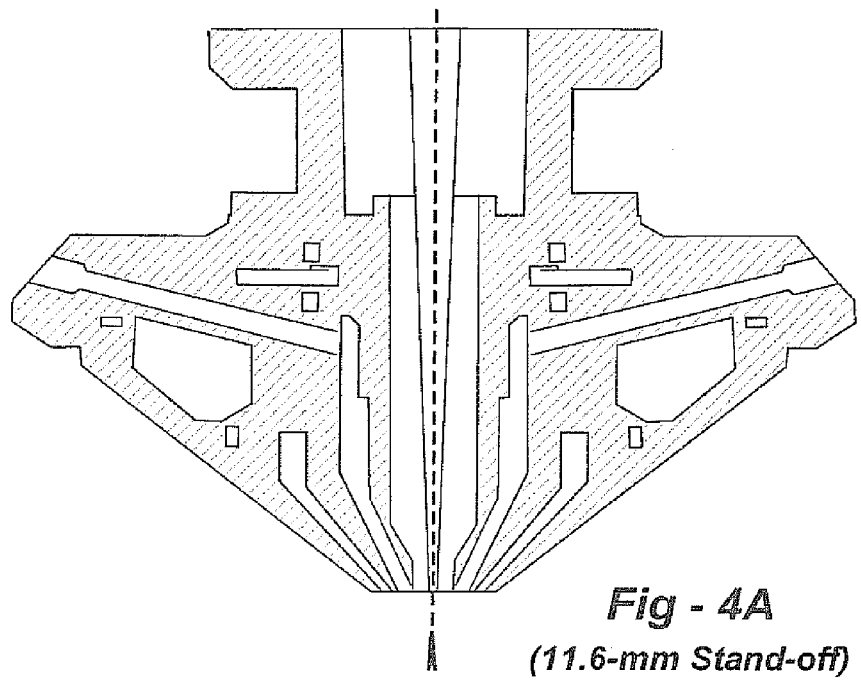
FIGS. 4A and 4B show a nozzle design according to the invention.
Figure 4B:
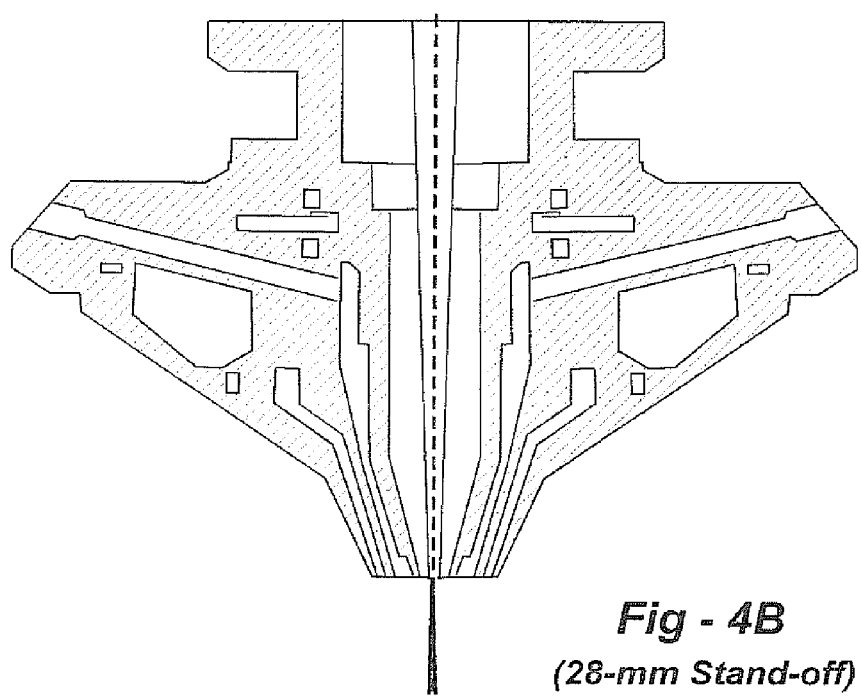

The nozzle design, shown in FIGS. 4A and 4B, preferably uses three concentric channels at the nozzle tip. The center one carries laser beam and shielding gas. The middle channel brings powder and shielding gas. There is an additional third channel ending with 16 orifices carrying the powder shaping shielding gas.

Figure 5:
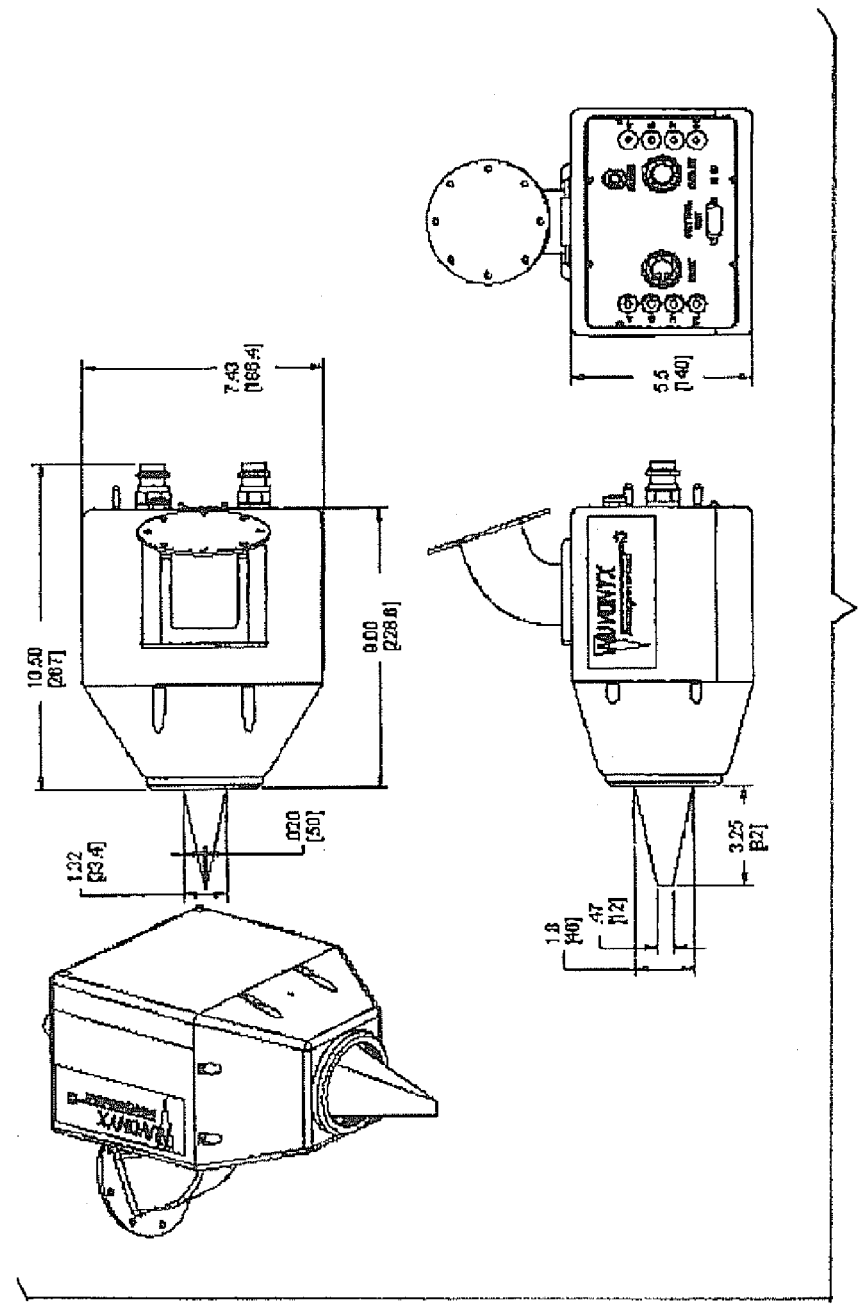
FIG. 5 shows a commercial diode laser used for the closed loop direct metal deposition.
Figure 6:
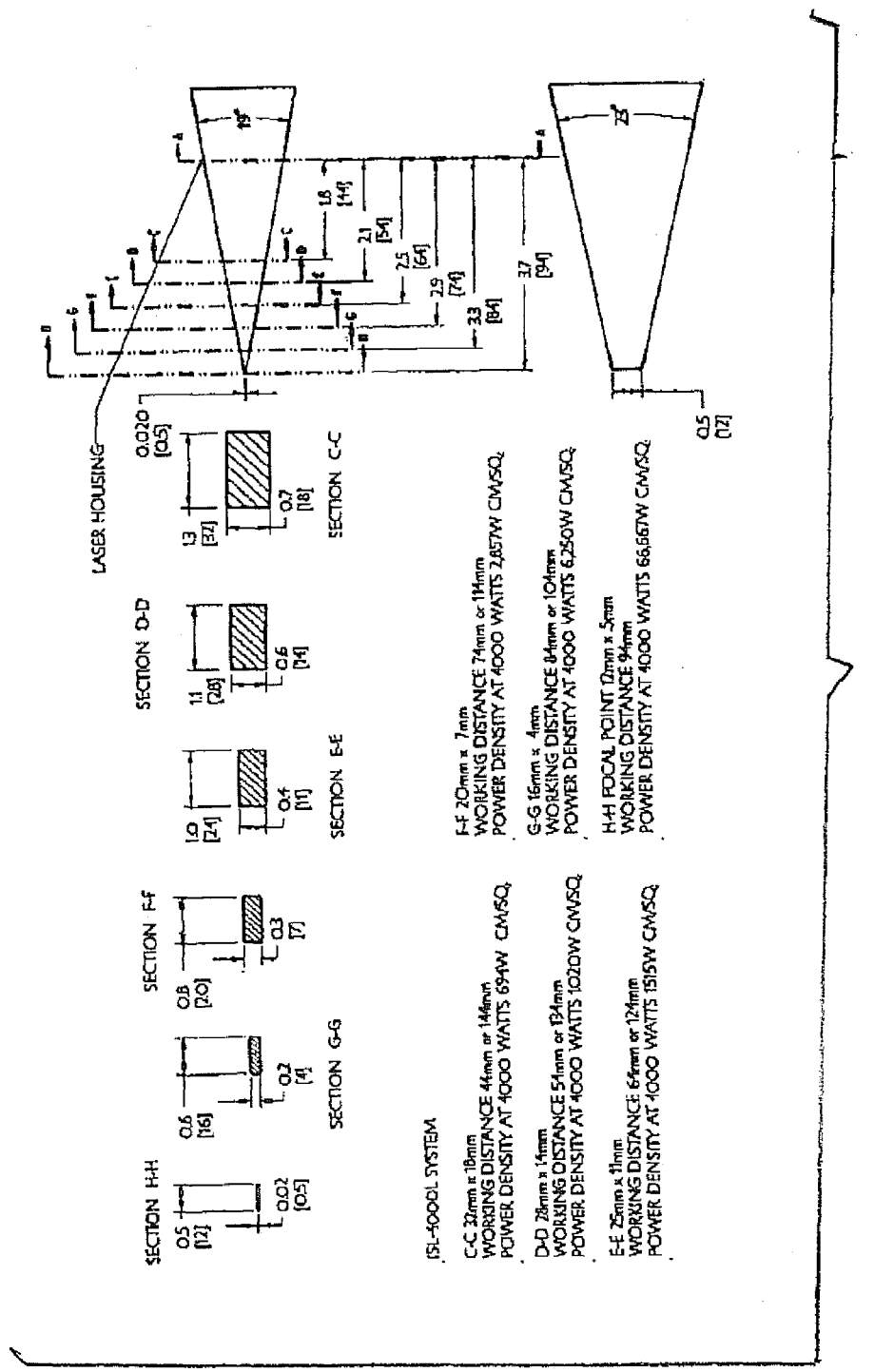
FIG. 6 illustrates the relationship between beam profile, focal distance and power density.

FIG. 5 shows a commercial diode laser used for the closed loop direct metal deposition. Note that beam profile is rectangular. FIG. 6 illustrates the relationship between beam profile, focal distance and power density. For closed loop direct metal deposition, power density is one of the critical factors since the feedback process controls the output power and thus the power density. It is also obvious from these two figures that beam focusing nozzle aperture has to be larger with rectangular aperture to accommodate power density. Since coherence length of diode laser are small and divergence is high for diode laser compared to $CO_2$ or Nd YAG, adjusting the power density by defocusing is not a prudent idea and therefore nozzle design to accommodate converging beam is important.

If an array of laser diodes is used s the source, conceptually each laser diode may be addressed individually. Therefore, diode laser DMD has the possibility of changing the beam shape by electrical signal input to match the shape of the deposit profile. For $CO_2$ and Nd YAG the laser optics has to be changed to change the shape of the beam. This increased flexibility again takes closed loop direct metal deposition into a paradigm that is not available at this time.

By changing the stand-off distance and the focusing angle of the central nozzle one can effectively focus the powder to the laser meltpool leading to increased powder utilization and better thermal management. This nozzle, with enhanced shielding and powder shaping capability combined with rapid feedback response will provide better dimensional accuracy. It was also observed that increased mass flow reduces the residual stress build up. Enhanced powder utilization should increase the mass flow under a given condition.

We claim:

1. A method of depositing material on a substrate, comprising the steps of:
   heating the substrate with a high-power, rapid-response diode laser to create a melt pool in a laser interaction zone;
   feeding material into the melt pool to create a deposit having a physical dimension;
   monitoring the laser interaction zone directly, without using any source of energy other than the diode laser used to heat the substrate, to generate an optical signal indicative of the physical dimension; and
   controlling the deposition using the optical signal.

2. The method of claim 1, wherein the deposition is controlled by modulating the laser.

3. The method of claim 2, wherein the modulation of the laser is in the kilohertz range.

4. The method of claim 2, wherein the modulation of the laser is up to 20 kHz.

5. A method of depositing material on a substrate, comprising the steps of:
   a) heating the substrate with a high-power, rapid-response diode laser to create a melt pool in a laser interaction zone;
   b) feeding material into the melt pool to create a deposit having a physical dimension;
   c) monitoring the laser interaction zone directly, without using any source of energy other than the diode laser used to heat the substrate, to generate an optical signal indicative of the physical dimension;
   d) feeding the optical signal to the laser to adjust the output of the laser; and
   e) repeating steps c) and d) at a rate of up to 20 kHz to achieve a desired physical dimension.

* * * * *